March 26, 1968   E. B. NOVIKOFF   3,375,515
PULSED TRACKING RANGE RADAR DECEPTION SYSTEM
Filed April 18, 1955
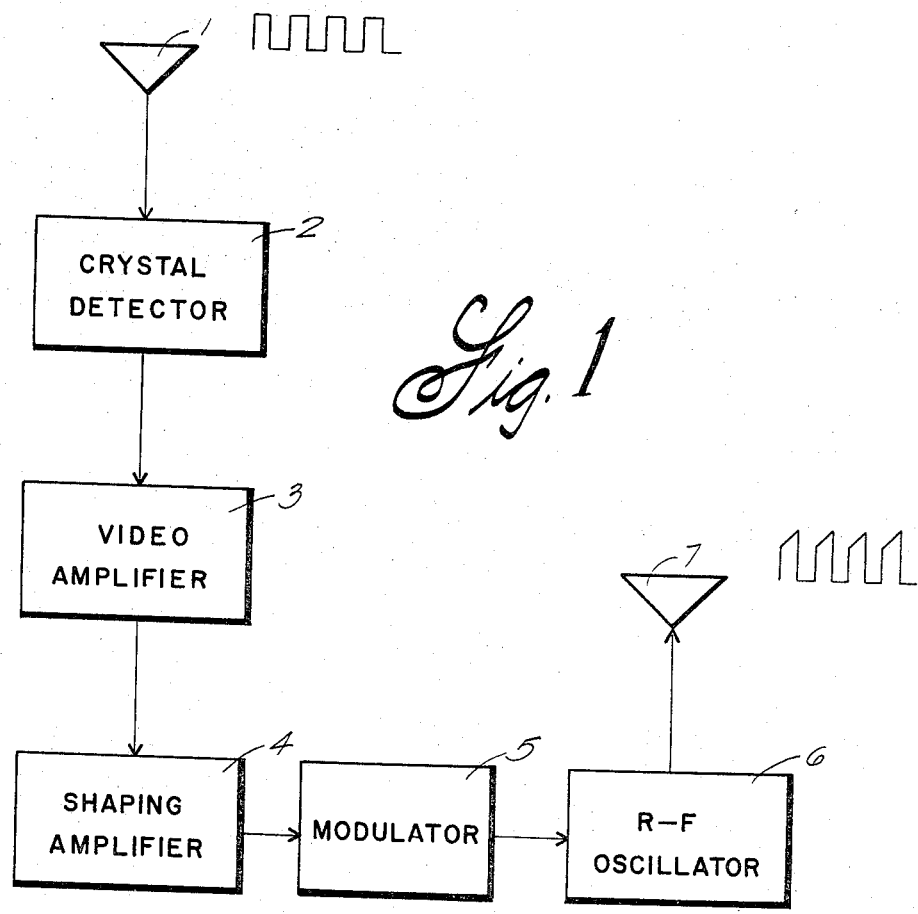
INVENTOR.
EUGENE B NOVIKOFF
BY
H. H. Carnigan
Attorneys

United States Patent Office 3,375,515
Patented Mar. 26, 1968

3,375,515
PULSED TRACKING RANGE RADAR
DECEPTION SYSTEM
Eugene B. Novikoff, East Meadow, N.Y., assignor, by mesne assignments, to the United States of America as represented by the Secretary of the Navy
Filed Apr. 18, 1955, Ser. No. 502,252
2 Claims. (Cl. 343—6.8)

This invention relates to a device for deceiving a pulsed tracking radar as to the range of a target. More specifically it relates to a means for generating and transmitting a trapezoidal pulse from a target such as an aircraft to cause the tracking gate on the radar to be offset from the true target return and thus deceive the radar as to the range of the target.

In radar or radio energy systems capable of first searching a given area and then automatically tracking a particular target selected from the search area, the following technique is generally used. Upon the detection of a target in the search area an alarm circuit is energized. The receipt of a target return causes a tracking circuit to be connected to a range voltage circuit. A gating circuit associated with the tracking circuit may either generate a gate having a duration greater than the length of the target signal or gate signals prior to and subsequent to the target signal. These gates permit the video input to conduct only during the period of the gate. This tracking circuit further regulates the amount of the range voltage in accordance with the position of the target by reference to its changing position to either side of the longer gate or to either one or the other of the prior and subsequent gates. The gating signal in the tracking circuit depends for its changing position also upon the relative position of the target return and the application of a signal other than the target but of greater amplitude could shift the gate and cause inaccurate information to be developed as to the range of the target.

Therefore, it is an object of this invention to provide a device for deceiving pulse type echo ranging systems as to the range of a possible target.

It is another object of this invention to provide a device for deceiving a pulsed tracking radar as to the range of a target by providing a means for shifting the gates in the tracking circuit thereof.

It is still another object of this invention to provide a device for generating a deceiving signal to be transmitted to a tracking radar upon the reception of a transmitted pulse from said radar.

It is a further object of this invention to provide a transponder for developing a trapezoidal pulse upon the receipt of a transmitted pulse, which trapezoidal pulse may identify a friend in an IFF system or if received an automatic tracking radar may shift the gates in the tracking circuit thereof and thus cause incorrect information as to the range of the vehicle carrying the transponder to be developed.

It is a still further object of this invention to provide a trapezoidal pulse generating transponder which generates such a pulse upon the reception of a transmitted pulse from an automatic tracking radar to cause the gates in said radar to be shifted to the edge of the trapezoidal pulse of greatest amplitude and away from the true target return.

These and other objects and many of the attendant advantages of this invention will be readily appreciated as the same becomes better understood by reference to the following detailed description when considered in connection with the accompanying drawings wherein:

FIGURE 1 is a block diagram of a transponder embodying the invention.

FIGURE 2 is a graph showing the relative amplitudes and position of the pulses in time.

Referring now to the FIGURE 1, there will be seen a transponder system which can be carried by any vehicle subject to possible detection by a tracking radar system. Such a vehicle could be an aircraft or a ship carrying out an attack mission.

The transponder includes a receiving antenna 1 carried on any suitable part of the vehicle to receive transmitted pulses from the radar. The output of the antenna 1 is fed to a detector 2 which may be of the crystal variety or any other device capable of performing the conventional detecting operation. After detection the signal is fed to a video amplifier 3 and after amplification to the shaping amplifier 4.

The shaping amplifier 4 shapes the pulse received from the video amplifier 3 into one of trapezoidal wave shape. The output pulse from the shaper 4 is such that its trailing edge is of greater amplitude than its leading edge. The trapezoidal pulse thus generated is fed to the modulator 5 whose output modulates the R.F. oscillator 6. A transmitting antenna 7 completes the device so that the trapezoidal pulse is directed out to the radar transmitting the original pulse.

The operation of the system can best be understood by reference to FIGURE 2 wherein the relative amplitudes and time positions of the various pulses are illustrated.

In the ordinary operation of a pulsed tracking radar the tracking gate centers itself about the region of the strongest target return signal. In FIGURE 2 this is illustrated by curves (a) and (b) which show a target return 10 to the radar receiver and centered about it in time is the gate 12 developed in the tracking circuit. The gate illustrated in this figure is of the type which surrounds the target return in time but it is to be understood that the same principle applies to those gating systems which develop a prior and subsequent gate surrounding the target return.

Upon the receipt of a jamming pulse 14 developed by the transponder of FIGURE 1 and transmitted by antenna 7 thereof, the gate 12 shifts to the new position as shown by gate 12' in curve (c). Thus, action is a consequence of the operation of gate in centering itself about the region of strongest return signal. Therefore, there is a shift from centering about the leading edge 13 of the pulse 14 to the trailing edge 15 thereof which has a greater amplitude. Since the range information is obtained considering the relationship of the return signal to the gate, incorrect range information results.

In an I.F.F. system the transmitting radar could make a determination of the target by visually observing a radar scope to see if a proper pulse has been received.

The particular form of wave developed and transmitted by the transponder of FIGURE 2 is by way of example only. It is to be understood that in accordance with the basic proposal that the essential characteristic which the deceiving pulse must exhibit is sufficient amplitude to cause the gate to shift.

Obviously many modifications and variations of the present invention are possible in the light of the above teachings. It is therefore to be understood that within the scope of the appended claims the invention may be practiced otherwise than as specifically described.

What is claimed is:
1. In a transponder combination including signal receiving, detecting and amplifying means, means for converting a received signal into a trapezoidal-shaped pulse having a leading edge that is greater in amplitude than the received signal and a trailing edge that is greater in amplitude than the leading edge; and means for transmitting said pulse toward the direction from which the received signal emanated.

2. A pulsed tracking radar range deception system comprising a receiving antenna to be carried by a potential radar target capable of receiving pulses emanating from radar apparatus; detector and amplifier means coupled to the output of the antenna; a wave-shaping amplifier which is coupled to the output of the detector and amplifier means and which develops a trapezoidal-shaped pulse having a trailing edge of greater amplitude than its leading edge; modulation means coupled to the output of the wave-shaping amplifier; an oscillator coupled to the output of the modulation means; and a transmitting antenna which is driven by the output of the oscillator.

References Cited
UNITED STATES PATENTS

| | | | |
|---|---|---|---|
| 2,440,253 | 4/1948 | Dodington | 343—6.8 |
| 2,561,363 | 7/1951 | Haeff et al. | 343—18 |
| 2,440,253 | 4/1948 | Dodington | 343—6.8 |

RODNEY D. BENNETT, *Primary Examiner.*

NORMAN H. EVANS, *Examiner.*

M. A. MORRISON, M. F. HUBLER,
*Assistant Examiners.*